Patented Aug. 16, 1932

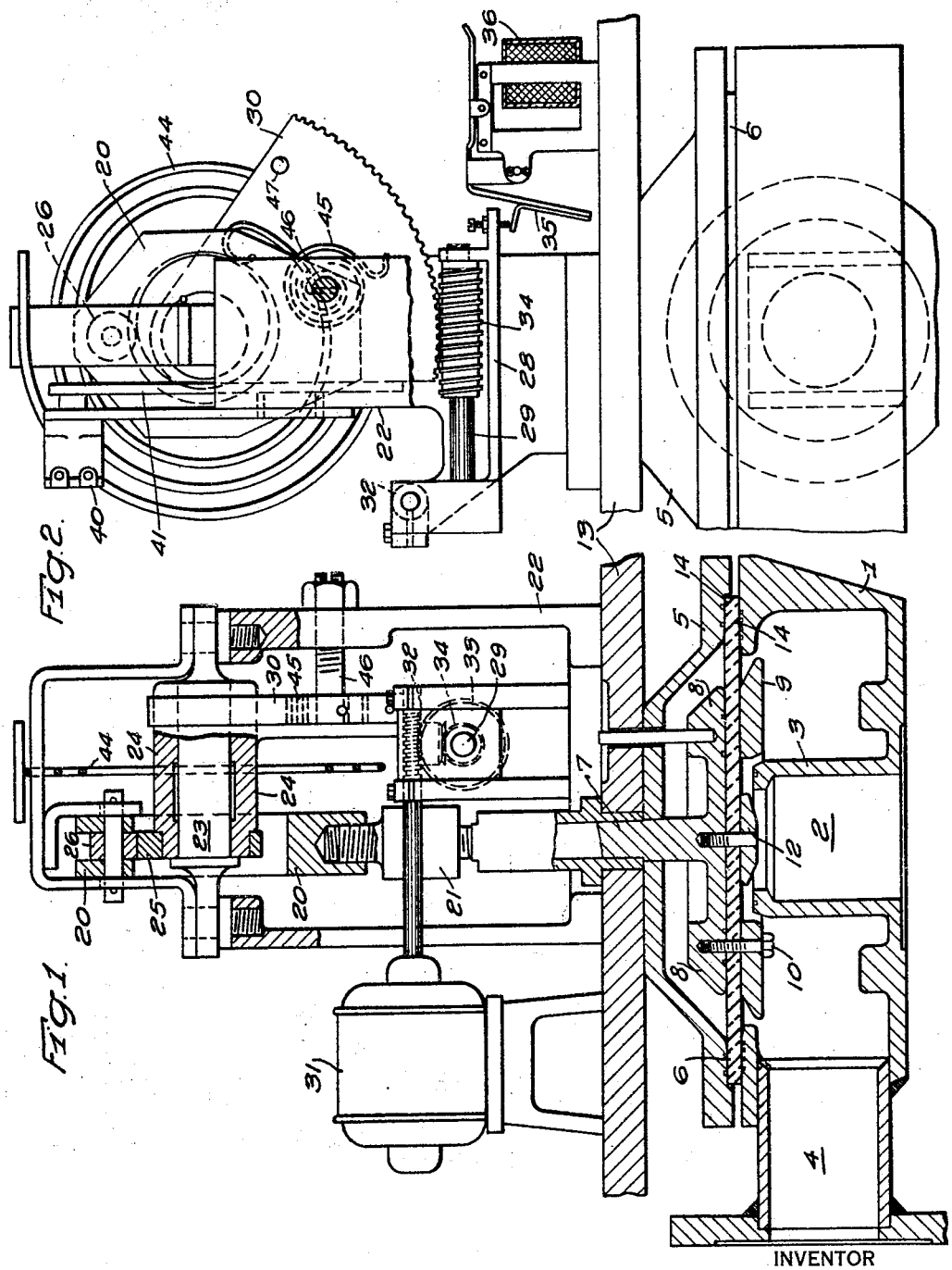

1,872,383

UNITED STATES PATENT OFFICE

WILLIAM B. ANDERSON, OF WILKINSBURG, PENNSYLVANIA, ASSIGNOR TO WESTINGHOUSE ELECTRIC & MANUFACTURING COMPANY, A CORPORATION OF PENNSYLVANIA

AUTOMATIC VACUUM VALVE

Application filed April 4, 1930. Serial No. 441,696.

My invention relates to automatic vacuum valves and more particularly to such valves as close under the influence of atmospheric pressure.

Heretofore, vacuum valves have been very uncertain in their operation. Either the valves did not seat absolutely vacuum tight or, in many cases, the closure mechanism would not operate quickly enough to prevent loss of vacuum in case of failure of power to the vacuum pump.

The valve gear was so complicated or so delicate of adjustment, in many cases, that the constant attention of a skilled mechanic was necessary to keep the valve in operative condition.

I have obviated all these difficulties by devising a valve of few and simple parts to seat under the influence of atmospheric pressure. Also, a valve which will be instantly tripped upon failure of the power supply to the pump, so that there is no loss of vacuum in case of pump failure.

It is an object of my invention to provide an improved automatic valve.

It is a further object of my invention to provide an improved closure element for an automatic valve.

It is a further object of my invention to provide an improved operating mechanism for an automatic valve.

Other objects and advantages of my improved mechanism will become apparent from the following detailed description, taken in conjunction with the appended drawing, in which;

Fig. 1 is a sectional elevation through the valve and operating mechanism therefor, and Fig. 2 is a fragmentary side elevation of the valve and mechanism, parts being broken away for clearness.

The apparatus disclosed in the drawing comprises a valve chamber 1 having a plurality of openings therein, one of said openings 2 being in the center of the bottom of the chamber and having an upstanding tubular boss 3 projecting into the body of the chamber.

At any convenient point, preferably in the side wall of the chamber, is provided another opening 4.

The upper or open side of the chamber is provided with a closure plate 5, constituting a protective covering over a rubber diaphragm 6 which is disposed between the closure plate and the body 1 of the chamber. The rubber diaphragm 6 is adapted to seat on the upstanding tubular boss 3.

Extending through a hole in the cover is a plunger 7 having an enlarged head 8. The plunger-head 8 is operatively secured to the diaphragm 6 by means of a ring 9 located in the valve chamber and screws 10 extending through holes in the diaphragm. The ring 9 is of such size and is so placed as to encircle the upstanding tubular boss 3 when the diaphragm 6 is seated on its upper end.

The diaphragm 6 is also preferably provided with a circular plate 12 of such size as to readily pass into the end of the boss 3, said plate 12 being also bolted to the plunger-head 8 to hold the center of the diaphragm against it.

In order to secure vacuum-tightness between the body of the valve and the diaphragm 6, it is preferable to provide a plurality of annular grooves 14 in the faces of the bodies 1 and 5 to which the diaphragm is applied. Similar grooves may likewise be provided in the plunger-head 8 and in the end of the boss 3 or in either of them.

The operating mechanism for my valve comprises a cam follower 20 connected to the top of the valve plunger 7 by means of a turnbuckle 21.

Mounted on a base plate 13 is a framework 22 in which is mounted a stationary shaft 23. A hollow shaft 24 is mounted, for rotative movement, upon the shaft 23. Rigidly secured to the hollow shaft 24 is a cam or eccentric 25 for cooperation with the cam follower 20. In order to secure ease of operation, it is preferable to provide the cam follower 20 with a roller 26 to make contact with the eccentric member 25.

Also rigidly connected to the shaft 24 is a segmental gear 30 for operation of the cam or eccentric 25.

The power mechanism for opening the valve comprises a high-speed motor 31 connected, by means of a worm 32 and a worm wheel 33, to a shaft 29 which is provided with a worm 34 to engage or be disengaged from the gear segment 30 in accordance with the actuation of a bell-crank lever 35 by a holding magnet 36 and by gravity, the shaft 29 and its worm 34 being mounted in a pivotally supported frame 28.

The holding magnet 36 is preferably connected to the power source (not shown) for the vacuum pump, so that, when power is applied to the pump, the magnet will pull down the horizontal arm of the elever 35 and raise the worm 34 into mesh with the teeth of the segmental gear 30.

The valve-opening motor 31 is preferably energized from the same source as the magnet 36, so that, as soon as the worm 34 is moved into mesh with the segmental gear 30, the motor will drive the segmental gear, which, in turn, will drive the eccentric 25 and lift the plunger 7, and with it, the diaphragm 6.

A limit switch 40 is so placed that, when the valve is totally open, an arm 41 on the gear 30 will operate the switch to open-circuit the motor 31. However, the holding coil 36 will remain energized so that the worm 34 will be in mesh with the segmental gear 30 and, as a worm wheel will not drive a worm, the worm and gear in mesh will constitute a locking means to hold the valve in open position.

However, upon failure of the power supply to the pumping mechanism, the holding coil 36 will be deenergized to allow the worm to drop out of mesh with the segmental gear, and permitting the diaphragm 6 of the valve to be moved down, by atmospheric pressure, into closed position. The segmental gear 30 is biased toward its inactive position by a spring 44. However, the shock due to the return of the gear 30 to its inactive position may be absorbed by a resilient member 45 mounted on a bolt 46 to engage a stud 47 on the gear 30 near the end of its movement, thus preventing unnecessary vibration of the gear.

Immediately upon the release of the holding coil 36, the gear 30 will begin to return to its initial position under the influence of the spring 44. The movement of the gear 30 and the eccentric 25 releases the pressure which held cam follower 20 in position, and the valve at once seats under the influence of the atmospheric pressure acting upon the upper surface of the diaphragm 6. This atmospheric pressure will press a portion of the diaphragm into firm contact with the top of the boss 3 and provide a vacuum-tight seal. Even if air should diffuse through the body of the rubber diaphragm there would be little danger of its entering the evacuated chamber to which the valve is attached because of the shielding of that portion of the diaphragm comprising the valve seat by the enlarged valve stem head 8 and the clamping ring 9.

The valve will hold vacuum-tight even if the vacuum in the chamber of the valve be materially impaired, but, in case full atmospheric pressure is to be admitted to the valve chamber, it is necessary to provide a spring (not shown) or other means to hold the valve in closed relation.

The operation of my device is as follows:

Upon energization of the pumping mechanism, (not shown) and, consequently, of the holding coil and the valve-opening motor, the motor will be set in motion, and, through the reduction gear and the worm in mesh with the segmental gear, it will rotate the eccentric 25 to open the valve. When the valve has been completely opened, the limit switch 40 will disconnect the motor, leaving the valve in open condition so long as power is supplied to the holding coil.

Upon failure of power to the holding coil, the worm 34 will drop out of mesh with the segment 30, permitting the segment to return to its original position under the influence of the spring 44, and allowing the valve to close under atmospheric pressure.

I do not desire to restrict myself to the specific embodiment of my invention herein shown and described, since it is evident that it may be changed and modified without departing from the spirit and scope of my invention as defined in the appended claims.

I claim as my invention:

1. An automatic vacuum valve comprising a valve chamber having an open top side and a passage in one of the remaining sides of the chamber, an upstanding tubular boss in the bottom of the chamber, a flexible diaphragm closing the open side of the chamber, a cover disposed above the diaphragm, an actuating member for the valve extending through said cover and operatively connected to said diaphragm, an eccentric operatively connected to the top of the actuating member to open the valve against the atmospheric pressure on the diaphragm, operating means for the eccentric comprising a gear segment operatively connected thereto, a motor-driven gear driving the segment to open the valve, means for locking the segment in position to hold the valve open, means for tripping the locking means, and means for returning the segment to its initial position, the valve closing automatically on release of the locking means.

2. An automatic vacuum valve comprising a valve body having a plurality of openings, means for closing one of the openings comprising a rubber diaphragm, a protective covering above the diaphragm, a plunger operatively connected to the diaphragm, said plunger opening the passage by flexing the diaphragm against atmospheric pressure, a motor for operating the plunger and means for connecting and disconnecting said motor from the plunger, the valve being closed and maintained closed by atmospheric pressure on the diaphragm when the motor is disconnected.

3. An automatic vacuum valve comprising a valve body having a plurality of openings, means for closing one of the openings comprising a flexible diaphragm, a protective covering above the diaphragm, a plunger operatively connected to the diaphragm, said plunger opening the passage by flexing the diaphragm against atmospheric pressure, a cam for operating said plunger, a motor for rotating the cam, means for disconnecting the motor from the cam and means for returning the cam to its initial position when it is disconnected from the motor.

4. An operating mechanism for a vacuum valve comprising a diaphragm in the valve, a plunger operatively connected to the diaphragm, a shaft fixed above the valve and passing through an opening in the top of the plunger, an eccentric mounted on the shaft and within the opening, means for rotating the eccentric comprising a segmental gear mounted on the shaft, a motor geared to said segmental gear, a limit switch to stop the motor when the valve is fully opened, locking means to hold the valve open, means for releasing the locking means to permit closing of the valve, means operable upon the release of the locking means for returning the segmental gear and the eccentric to their initial positions, and means operated by atmospheric pressure to close the valve.

In testimony whereof, I have hereunto subscribed my name this 31st day of March, 1930.

WILLIAM B. ANDERSON.